US012700255B1

(12) United States Patent
Sahu et al.

(10) Patent No.: US 12,700,255 B1
(45) Date of Patent: Aug. 4, 2026

(54) SYSTEM AND METHOD FOR MOBILE FINGERPRINT RECOGNITION

(71) Applicant: THALES DIS FRANCE SAS, Meudon (FR)

(72) Inventors: Chinmay Sahu, El Monte, CA (US); Songtao Lester Li, Arcadia, CA (US); Amit Pandey, Duarte, CA (US)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 19/096,902

(22) Filed: Apr. 1, 2025

(51) Int. Cl.
| | |
|---|---|
| *G06V 40/12* | (2022.01) |
| *G06V 10/24* | (2022.01) |
| *G06V 10/25* | (2022.01) |
| *G06V 10/32* | (2022.01) |

(52) U.S. Cl.
CPC .......... *G06V 40/1347* (2022.01); *G06V 10/24* (2022.01); *G06V 10/25* (2022.01); *G06V 10/32* (2022.01); *G06V 40/1365* (2022.01)

(58) Field of Classification Search
CPC .... G06V 40/1347; G06V 10/24; G06V 10/25; G06V 10/32; G06V 40/1365
See application file for complete search history.

(56) References Cited

U.S. PATENT DOCUMENTS

| | | | | |
|---|---|---|---|---|
| 2008/0298642 | A1* | 12/2008 | Meenen | G06V 40/10 |
| | | | | 382/115 |
| 2016/0180142 | A1* | 6/2016 | Riddle | G06V 40/1312 |
| | | | | 382/124 |
| 2019/0362130 | A1* | 11/2019 | Othman | G06V 40/13 |

* cited by examiner

*Primary Examiner* — Abhishek Sarma

(57) ABSTRACT

A system (100) and method (600) for mobile fingerprint recognition is disclosed. The method (600) comprises receiving an image of a fingerprint. The method (600) further comprises detecting a set of parameters associated with the fingerprint. Further, the method (600) comprises aligning the fingerprint in the image based on the detected set of parameters. The method (600) further comprises extracting a normalized fixed size Region of Interest (ROI) from the aligned fingerprint. Further, the method (600) comprises generating a fixed-length feature set from the extracted ROI. The method (600) further comprises performing one or more operations on the fingerprint based on the generated fixed-length feature set.

13 Claims, 6 Drawing Sheets

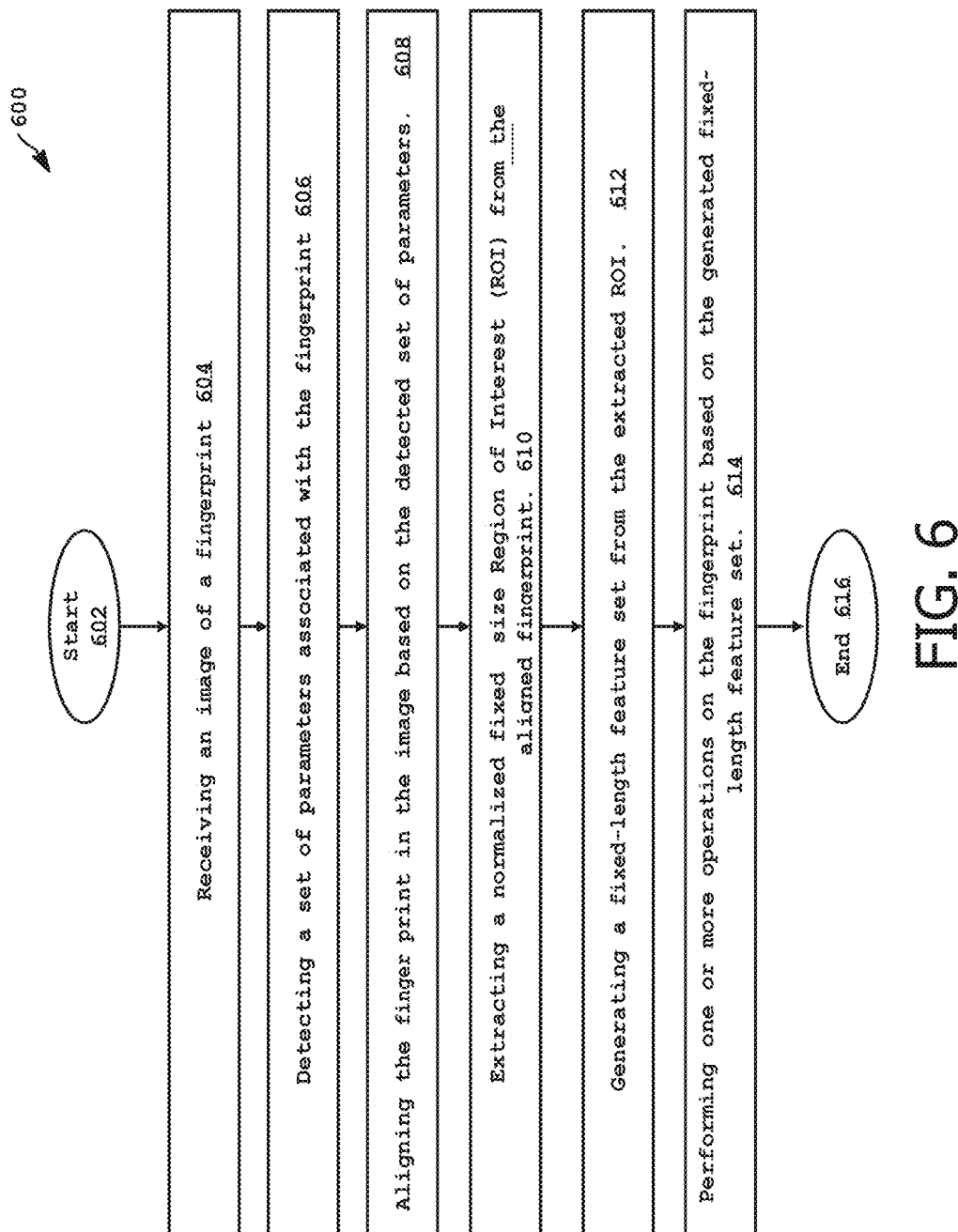

600

Start 602

Receiving an image of a fingerprint 604

Detecting a set of parameters associated with the fingerprint 606

Aligning the finger print in the image based on the detected set of parameters. 608

Extracting a normalized fixed size Region of Interest (ROI) from the aligned fingerprint. 610

Generating a fixed-length feature set from the extracted ROI. 612

Performing one or more operations on the fingerprint based on the generated fixed-length feature set. 614

End 616

FIG. 6

SYSTEM AND METHOD FOR MOBILE FINGERPRINT RECOGNITION

FIELD OF THE INVENTION

The present disclosure relates to a field of biometrics, and more specifically to a system and a method for mobile fingerprint recognition from an image.

BACKGROUND OF THE INVENTION

Fingerprint recognition has been widely adopted for biometric authentication due to its uniqueness, reliability, and ease of use. Traditional fingerprint recognition systems rely on contact-based sensors, where a user's finger is physically placed on a scanner. The traditional systems capture high-resolution images and extract minutiae points such as ridge endings and bifurcations to match fingerprints against stored templates. However, contact-based fingerprint systems face limitations, comprising hygiene concerns, sensor wear and tear, and image distortion due to pressure variations during scanning.

With the advent of contactless biometric authentication, fingerprint capture has evolved to use optical or camera-based sensors to acquire images without direct contact. While contactless fingerprint recognition offers several advantages, comprising improved hygiene, faster acquisition, and reduced sensor degradation, it also introduces significant technical challenges. Variations in finger positioning, rotation, illumination, and sensor resolution can negatively impact image quality, making traditional minutiae-based recognition methods less effective. Additionally, existing contactless systems often struggle with consistent feature extraction and alignment, leading to higher false rejection rates.

Several conventional techniques have been attempted to address these challenges. For example, techniques for minutiae-based feature extraction and pose-invariant fingerprint matching have been explored. Some methods rely on machine learning to correct alignment discrepancies, while others focus on enhancing resolution adaptability. However, these conventional techniques often fall short in efficiently indexing fingerprints for rapid retrieval, especially in large-scale databases. Furthermore, the conventional techniques require computationally expensive pre-processing and enhancement techniques, making real-time applications impractical.

Therefore, there is a need for a more efficient, flexible, and scalable solution for mobile fingerprint recognition.

SUMMARY

The following embodiments presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Some example embodiments disclosed herein provide a method for mobile fingerprint recognition, the method comprising receiving, by a processing engine, an image of a fingerprint. Further, the method comprising detecting, by the processing engine, a set of parameters associated with the fingerprint. The method further comprises aligning, by the processing engine, the fingerprint in the image based on the detected set of parameters. Further, the method comprises extracting, by the processing engine, a normalized fixed size Region of Interest (ROI) from the aligned fingerprint. The method further comprises generating, by the processing engine, a fixed-length feature set from the normalized fixed size ROI. Further, the method comprises performing, by the processing engine, one or more operations on the fingerprint based on the generated fixed-length feature set.

According to some example embodiments, the image of the fingerprint is cropped based on the extracted set of parameters.

According to some example embodiments, the set of parameters associated with the image comprises a baseline of the fingerprint and a fingertip of the fingerprint.

According to some example embodiments, the one or more operation comprises at least one of an indexing the fingerprint and a matching the fingerprint based on the extracted fixed-length feature set.

According to some example embodiments, performing the one or more operation comprising generating, by the processing engine, a multi-indexed feature representation using a local fingerprint database and a global fingerprint database. Further, the method comprises performing, by the processing engine, a similarity comparison of the extracted fixed-length feature set using a deep-learning-based matching algorithm. The method further comprises performing, by the processing engine, at least one of score-level fusion or hybrid matching.

According to some example embodiments, aligning the fingerprint comprising performing at least one of an Iterative Closest Point (ICP) and an Active Appearance Model (AAM) to refine alignment.

Some example embodiments disclosed herein provide a system for mobile fingerprint recognition, the system comprises a processing engine coupled to a memory. The processing engine is configured to execute instructions stored in the memory to receive an image of a fingerprint. Further, the processing engine is configured to execute instructions stored in the memory to detect a set of parameters associated with the fingerprint. The processing engine is configured to execute instructions stored in the memory to align the fingerprint in the image based on the detected set of parameters. Further, the processing engine is configured to execute instructions stored in the memory to extract a normalized fixed size Region of Interest (ROI) from the aligned fingerprint. The processing engine is further configured to execute instructions stored in the memory to generate a fixed-length feature set from the extracted ROI. Further, the processing engine is further configured to execute instructions stored in the memory to perform one or more operations on the fingerprint based on the generated fixed-length feature set.

Some example embodiments disclosed herein provide a non-transitory computer-readable medium storing computer-executable instructions for mobile fingerprint recognition, the computer-executable instructions configured for receiving, by a processing engine, an image of a fingerprint. Further, the computer-executable instructions configured for detecting, by the processing engine, a set of parameters associated with the fingerprint. Further, the computer-executable instructions configured for aligning, by the processing engine, the fingerprint in the image based on the detected set of parameters. The computer-executable instructions configured for extracting, by the processing engine, a normalized fixed size Region of Interest (ROI) from the aligned fingerprint. Further, the computer-executable instructions configured for generating, by the processing engine, a fixed-length feature set from the extracted ROI.

The computer-executable instructions configured for performing, by the processing engine, one or more operations on the fingerprint based on the generated fixed-length feature set.

Definitions

The term "Fingerprint" as used herein in the specification may refer to a unique pattern of ridges and valleys present on a person's fingertip, which can be used for biometric identification.

The term "Biometric" as used herein in the specification may refer to a measurement and analysis of unique physical or behavioural characteristics of individuals, typically for identification and authentication purposes.

The term "Image processing techniques" as used herein in the specification may refer to a set of methods used to enhance, manipulate, and analyse digital images to improve their quality, extract relevant features, or prepare them for further processing. The image processing techniques are used for fingerprint alignment, noise reduction, and feature extraction.

The term "Iterative Closest Point (ICP)" as used herein in the specification may refer to an algorithm used for aligning two point clouds or sets of data points. The ICP is widely used in computer vision and biometrics, comprising fingerprint recognition, to refine alignment between two images or 3D models.

The term "Active Appearance Model (AAM)" as used herein in the specification may refer to a computer vision technique used for object alignment and shape modelling in images. The AAM combines shape and texture information to accurately represent and track deformable objects, such as human faces or fingerprints.

The term "Fixed-length features" as used herein in the specification may refer to a consistent and structured representation of biometric data (such as fingerprints) that maintains a fixed length regardless of variations in the original fingerprint image. These features are typically extracted using advanced machine learning or deep learning techniques and are actively optimized for accuracy, robustness, and efficiency in fingerprint recognition.

The term "multi-indexing" as used herein in the specification may refer to a use of multiple indexing techniques to efficiently search and retrieve fingerprint records from a database. Instead of relying on a single feature or indexing strategy, multi-indexing combines various levels of fingerprint characteristics to improve search speed and accuracy.

BRIEF DESCRIPTION OF DRAWINGS

The above and still further example embodiments of the present invention will become apparent upon consideration of the following detailed description of embodiments thereof, especially when taken in conjunction with the accompanying drawings.

FIG. 6 illustrates an exemplary flow chart of a method for mobile fingerprint recognition, in accordance with an exemplary embodiment.

Figure 1:
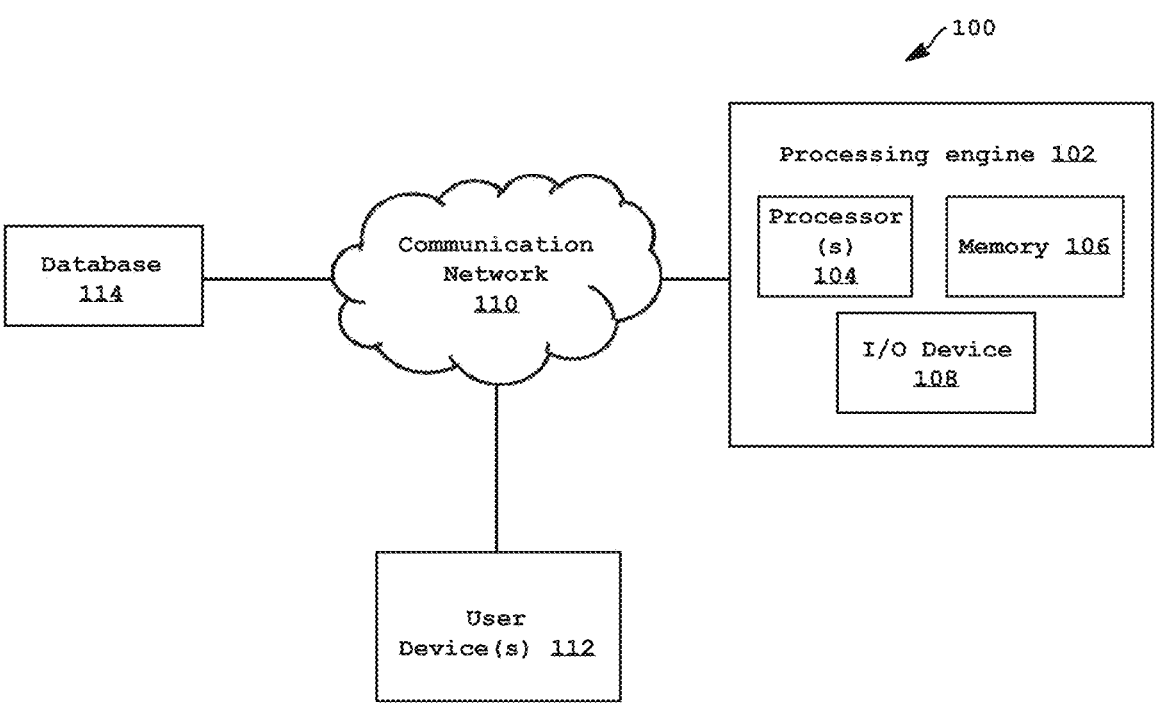
FIG. 1 illustrates a block diagram of an exemplary system for mobile fingerprint recognition, in accordance with an exemplary embodiment.

The figures illustrate embodiments of the invention for purposes of illustration only. One skilled in the art will readily recognize from the following description that alternative embodiments of the structures and methods illustrated herein may be employed without departing from the principles of the invention described herein.

DETAILED DESCRIPTION

In the following description, for purposes of explanation, numerous specific details are set forth in order to provide a thorough understanding of the present invention. It will be apparent, however, to one skilled in the art that the present invention can be practiced without these specific details. In other instances, systems, apparatuses, and methods are shown in block diagram form only in order to avoid obscuring the present invention.

Reference in this specification to "one embodiment" or "an embodiment" or "example embodiment" means that a particular feature, structure, or characteristic described in connection with the embodiment is comprised in at least one embodiment of the present invention. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

The terms "comprise", "comprising", "includes", or any other variations thereof, are intended to cover a non-exclusive inclusion, such that a setup, device, or method that comprises a list of components or steps does not comprise only those components or steps but may comprise other components or steps not expressly listed or inherent to such setup or device or method. In other words, one or more elements in a system or apparatus proceeded by "comprises . . . a" does not, without more constraints, preclude the existence of other elements or additional elements in the system or method.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

Fingerprint recognition is one of the most widely used biometric authentication methods due to its uniqueness, reliability, and ease of use. Traditional fingerprint recognition systems require physical contact with a scanner, where users place their fingers on a sensor to capture high-resolution images. While this method has been effective for decades, it presents several limitations, comprising hygiene concerns, sensor wear and tear, and distortions caused by inconsistent finger pressure. These issues have led to the growing adoption of contactless fingerprint recognition, which eliminates direct contact with the sensor, improving both usability and durability.

Contactless fingerprint systems capture images using optical sensors or mobile cameras, offering advantages such as improved hygiene, faster processing, and the ability to work across different devices. However, these systems introduce new technical challenges, particularly in terms of alignment variations, inconsistent image resolution, and difficulties in extracting reliable fingerprint features for matching. Unlike contact-based fingerprint images, contactless fingerprints often suffer from distortions due to differences in finger positioning, rotation, and distance from the camera, making traditional recognition methods less effective.

To overcome these challenges, the present disclosure defines a novel coordinate system based on the fingertip and finger baseline, ensuring that fingerprint images are consistently aligned regardless of how the finger is positioned during capture, eliminating distortions caused by rotation and translation, providing a standardized reference for feature extraction. Additionally, the present disclosure incorporates a dynamic cropping method to handle varying image resolutions. Since different sensors and mobile devices capture fingerprint images at different resolutions, this adaptive cropping technique extracts a region of interest (ROI), that then normalized to a fixed size for maintaining consistency in feature representation, ensuring that fingerprint images remain comparable across different devices and environments.

To enhance recognition accuracy and speed, the present disclosure employs deep learning-based fixed-length feature generation. Unlike conventional minutiae-based approaches that produce variable-length feature sets, the present disclosure converts fingerprint images into standardized feature vectors, making fingerprint indexing and matching more efficient. The system also integrates a multi-indexing approach, leveraging both global and local fingerprint features for fast and accurate database searches. Global features, such as ridge patterns, help filter potential matches, while local minutiae-based features refine the search for precise identification. Furthermore, deep learning-based matching techniques are used to improve accuracy, reducing false rejection rates and ensuring robust recognition in real-world conditions. By combining these innovations, the present disclosure enhances the scalability, speed, and reliability of contactless fingerprint recognition, making it ideal for biometric authentication in security, finance, law enforcement, and access control applications. The proposed disclosure is further explained in detail in FIGS. 1 to 7.

FIG. 1 illustrates a block diagram of an exemplary system 100 for mobile fingerprint recognition is illustrated, in accordance with an exemplary embodiment. The system 100 may comprise a processing engine 102, a user device 112, and a database 114 communicatively coupled to each other through a wired or wireless communication network 110. The processing engine 102 may comprise a processor 104, a memory 106 and an input/output (I/O) device 108.

In an embodiment, examples of processor(s) 104 may comprise, but are not limited to, microcontrollers, microprocessors, digital signal processors (DSPs), application-specific integrated circuits (ASICs), field-programmable gate arrays (FPGAs), system-on-chip (SoC) components, or any other suitable programmable logic devices. The processor 104 is responsible for executing the instructions stored in the memory 106 to carry out the functionality of the system 100, comprising optimizing state synchronization in the IoT network.

In an embodiment, the memory 106 may store instructions and data, comprising one or more modules that, when executed by the processor 104, may cause the processor 104 to recognize mobile fingerprint, as will be discussed in greater detail herein below. In an embodiment, the memory 106 may be a non-volatile memory or a volatile memory. In an embodiment, the memory 106 may also store a single module or a combination of different modules for mobile fingerprint recognition. Examples of non-volatile memory may comprise but are not limited to, a flash memory, a Read Only Memory (ROM), a Programmable ROM (PROM), Erasable PROM (EPROM), and Electrically EPROM (EEPROM) memory. Further, examples of volatile memory may comprise but are not limited to, Dynamic Random Access Memory (DRAM), and Static Random-Access memory (SRAM).

In an embodiment, the I/O device 108 may comprise of variety of interface(s), for example, interfaces for data input and output devices, and the like. The I/O device 108 may facilitate inputting of instructions by a user communicating with the processing engine 102. In an embodiment, the I/O device 108 may be wirelessly connected to the processing engine 102 through wireless network interfaces such as Bluetooth®, infrared, or any other wireless radio communication known in the art. In an embodiment, the I/O device 108 may be connected to a communication pathway for one or more components of the processing engine 102 to facilitate the transmission of inputted instructions and output results of data generated by various components such as, but not limited to, processor(s) 104 and memory 106.

In an embodiment, the communication network 110 may be a wired or a wireless network or a combination thereof. The communication network 110 can be implemented as one of the different types of networks, such as but not limited to, ethernet IP network, intranet, local area network (LAN), wide area network (WAN), an Internet of Things (IoT) network or a Metropolitan Area Network (MAN). Various devices in the system 100 may be configured to connect to the communication network 110, in accordance with various wired and wireless communication protocols. Examples of such wired and wireless communication protocols may comprise, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols. Further the communication network 110 may comprise a variety of network devices, comprising routers, bridges, servers, computing devices, storage devices, and the like.

In an embodiment, the processing engine 102 may receive an image of a fingerprint. The image of the fingerprint may be received from a user device 112 by a user. The user device 112 may be a laptop, a computer, a tablet, a smartphone, a camera, etc. Further, the processing engine 102 may detect a set of parameters associated with the fingerprint. The set of parameters associated with the image may comprise a baseline of the fingerprint and a fingertip of the fingerprint. The processing engine 102 may further align the fingerprint in the image based on the detected set of parameters. To align the fingerprint, the processing engine 102 may perform at least one of an iterative closest point (ICP) and an active appearance model (AAM) to refine alignment.

Further, the processing engine 102 may extract a normalized fixed size Region of Interest (ROI) from the aligned fingerprint. The ROI may be a section of the fingerprint cropped from the image of the fingerprint based on the extracted set of parameters. The processing engine 102 may further generate a fixed-length feature set from the normalized fixed size ROI. Further, the processing engine 102 may perform one or more operations on the fingerprint based on the generated fixed-length feature set. The one or more operation may comprise at least one of an indexing the fingerprint and a matching the fingerprint based on the extracted fixed-length feature set. To perform the one or more operation, the processing engine 102 may generate a multi-indexed feature representation using a local fingerprint database (database 114) and a global fingerprint database (database 114). Further, the processing engine 102 may perform a similarity comparison of the extracted fixed-length feature set using a deep-learning-based matching algorithm. Finally, the processing engine 102 may perform at least one of score-level fusion or hybrid matching.

In an embodiment, the database 114 may be a storage server that stores a plurality of fingerprints. The database 114 may be queried to index or match a fingerprint by the processing engine 102. The database 114 may be a local database which may contain localized fingerprints within an organization, or a global database that may contain the fingerprints from all the public repository of every public database of fingerprints.

Figure 2:
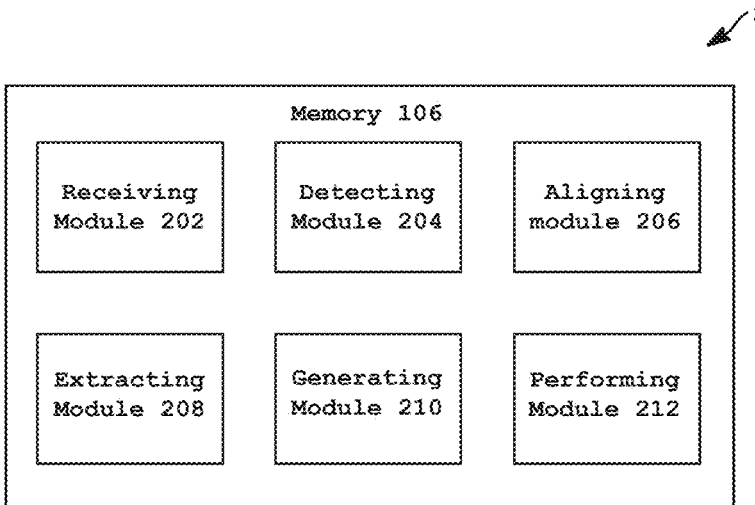
FIG. 2 illustrates a functional block diagram of various modules within a memory of the system for mobile fingerprint recognition, in accordance with an exemplary embodiment.

FIG. 2 illustrates a functional block diagram 200 of various modules within the memory 106 of the system 100 for mobile fingerprint recognition, in accordance with an exemplary embodiment. In an embodiment, the memory 106 may comprise a receiving module 202, a detecting module 204, an aligning module 206, an extracting module 208, a generating module 210, and a performing module 212.

The receiving module 202 may be configured to receive an image of a fingerprint. The receiving module 202 may be responsible for capturing, receiving, or retrieving fingerprint images from various input sources, ensuring that high-quality data is provided for subsequent processing. The input sources may comprise an optical or camera-based sensor, an Infrared (IR) or Multispectral Sensors, a database retrieval, a wireless or cloud based systems. When receiving the image of the fingerprint, the receiving module 202 may ensure that the captured data meets the required quality standards for further processing such as Resolution Consistency, an Alignment and Orientation, a noise Reduction and Enhancement, dynamic cropping, etc.

The detecting module 204 may be configured to detect a set of parameters associated with the fingerprint. The set of parameters associated with the image comprises a baseline of the fingerprint and a fingertip of the fingerprint. The detecting module 204 is responsible for analyzing the received fingerprint image and identifying crucial reference points to facilitate accurate feature extraction and alignment. The baseline of the fingerprint may be a lower boundary of the finger in the image, typically where the fingerprint ridge pattern begins to stabilize. Further, the fingertip of the fingerprint may be an uppermost point of the fingerprint, marking the tip of the finger. In an embodiment, the detecting module 204 may implement an edge detection algorithm (e.g., Sobel, Canny) to find the lower boundary of the fingerprint. Further, the detecting module 204 may perform shape analysis to identify the curved edge at the top of the fingerprint. The detecting module 204 may perform machine learning-Based Image Processing to improve robustness against variations in lighting and finger positioning.

The aligning module 206 may be configured to align the fingerprint in the image based on the detected set of parameters. The aligning module 206 may perform at least one of an iterative closest point (ICP) and an active appearance model (AAM) to refine alignment. Once the detecting module 204 identifies the set of parameters such as the baseline and fingertip, the aligning module 206 uses the extracted parameters to adjust the fingerprint's orientation, scale, and position. Proper alignment is essential for consistent feature extraction, matching accuracy, and interoperability across different devices and capture conditions. Further, the ICP is a geometric alignment algorithm used to align two sets of points in a coordinate space. The ICP aligns the captured fingerprint image with a reference fingerprint template by minimizing the difference between corresponding feature points. Further, the AAM is an advanced shape and texture modeling technique that improves fingerprint alignment by using a statistical model trained on a dataset of fingerprint images. The AAM learns how fingerprints typically deform and automatically adjusts the captured image to fit a standardized shape.

The extracting module 208 may be configured to extract a normalized fixed size Region of Interest (ROI) from the aligned fingerprint. After the aligning module 206 has corrected the fingerprint's position, orientation, and scale, the extracting module 208 focuses on isolating the most relevant portion of the fingerprint that contains distinctive biometric features. The ROI refers to the specific area of the fingerprint that contains unique ridge patterns, minutiae points, and textural details critical for biometric identification. In an embodiment, the extracting module 208 may implement a Contour-Based Extraction, a histogram thresholding, a machine learning based ROI detection, and an adaptive windowing. In simpler words, the extracting module 208 the fingertip and baseline to establish an initial boundary. The distance between the baseline and fingertip is used to determine an appropriate cropping ratio. The finger width and contour are analyzed to ensure that only the central fingerprint region is considered. Further, a dynamic cropping algorithm adjusts the extracted area based on the fingerprint's shape, size, and alignment. The extracting module 208 ensures that the extracted ROI remains consistent across different users and devices. Further, the extracted area is optimized for fingerprint minutiae and ridge structure visibility, ensuring that essential fingerprint patterns are preserved.

The generating module 210 may be configured to generate a fixed-length feature set from the normalized fixed size ROI. The generating module 210 follows a structured process to extract and encode fingerprint features into a fixed-length format. Once the ROI is extracted by the extracting module 208, the generating module 210 identifies distinctive fingerprint characteristics such as minutiae points, ridge patterns, and texture features. Further, these features are analyzed to form the basis of the fixed-length feature representation. To ensure a uniform feature size, the generating module employs advanced encoding techniques, such as deep learning based feature extraction, a feature hashing and compression, and a fingerprint template embedding. The generating module 210 is responsible for transforming the normalized fixe size ROI into a fixed-length fingerprint feature set, ensuring efficiency, accuracy, and interoperability in biometric recognition. By using deep learning, feature encoding, and normalization techniques, the generating module 210 provides a standardized and compact representation of fingerprint data that enables fast and precise identification in large-scale biometric systems.

The performing module 212 may be configured to perform one or more operations on the fingerprint based on the generated fixed-length feature set. The one or more operation comprises at least one of an indexing the fingerprint and a matching the fingerprint based on the extracted fixed-length feature set. To perform the one or more operation, the performing module 212 may generate a multi-indexed feature representation using a local fingerprint database and a global fingerprint database. The performing module 212 may perform a similarity comparison of the extracted fixed-length feature set using a deep-learning-based matching algorithm. Further, the performing module 212 may perform at least one of a score-level fusion or a hybrid matching. In simpler words, the performing module 212 is responsible for executing various operations on the fingerprint using the fixed-length feature set generated by the generating module 210. These operations primarily comprise fingerprint indexing and fingerprint matching, which are critical for biometric authentication and identification in contactless fingerprint recognition systems. To enhance search efficiency and accuracy, the performing module 212 utilizes multi-indexed feature representations by leveraging both local and global fingerprint databases. Additionally, the performing module 212 performs deep-learning-based similarity comparisons and employs advanced matching techniques, such as score-level fusion and hybrid matching, to improve recognition performance.

It should be noted that all such aforementioned modules 202-212 may be represented as a single module or a combination of different modules. Further, as will be appreciated by those skilled in the art, each of the modules 202-212 may reside, in whole or in parts, on one device or multiple devices in communication with each other. In some embodiments, each of the modules 202-212 may be implemented as dedicated hardware circuit comprising custom application-specific integrated circuit (ASIC) or gate arrays, off-the-shelf semiconductors such as logic chips, transistors, or other discrete components. Each of the modules 202-212 may also be implemented in a programmable hardware device such as a field programmable gate array (FGPA), programmable array logic, programmable logic device, and so forth. Alternatively, each of the modules 202-212 may be implemented in software for execution by various types of processors (e.g. processor 104). An identified module of executable code may, for instance, comprise one or more physical or logical blocks of computer instructions, which may, for instance, be organized as an object, procedure, function, or other construct. Nevertheless, the executables of an identified module or component need not be physically located together but may comprise disparate instructions stored in different locations which, when joined logically together, comprise the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for mobile fingerprint recognition. For example, the exemplary system 100 and the associated processing engine 102 may recognize mobile fingerprint by the processes discussed herein. In particular, as will be appreciated by those of ordinary skill in the art, control logic and/or automated routines for performing the techniques and steps described herein may be implemented by the system 100 and the associated processing engine 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some, or all of the processes described herein may be comprised in the one or more processors on the system 100.

Figure 3:
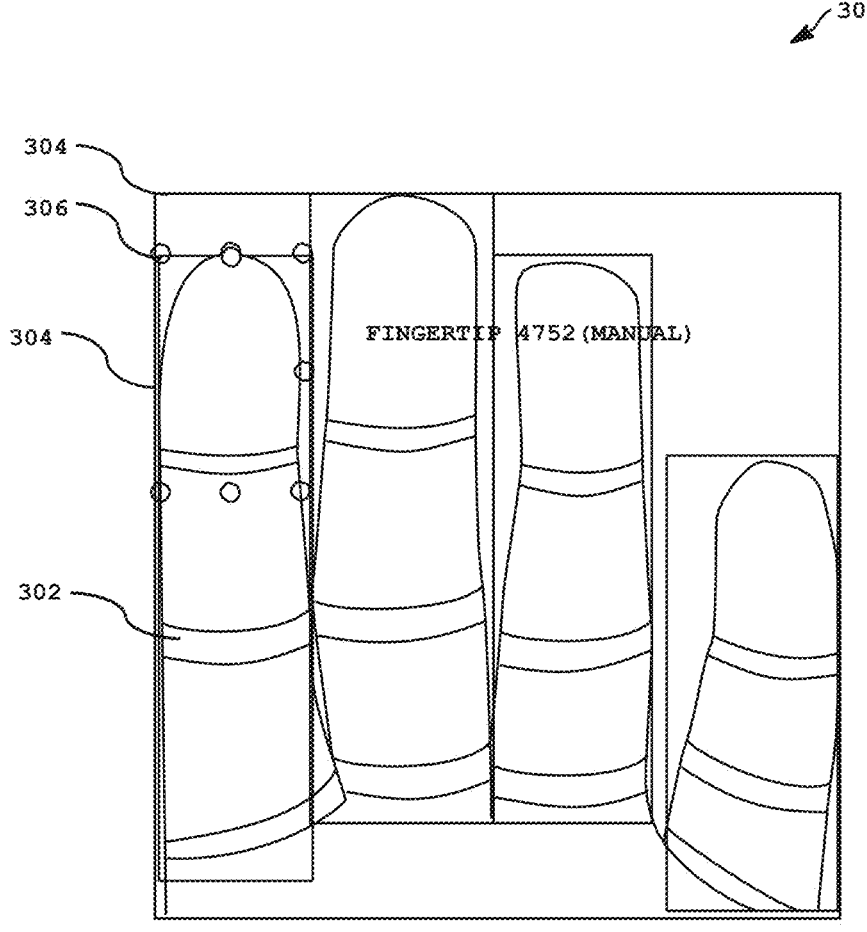
FIG. 3 illustrates an image of the fingerprint for detecting a set of parameters for mobile fingerprint recognition, in accordance with an exemplary embodiment.

FIG. 3 illustrates an image 300 of the fingerprint for detecting a set of parameters for mobile fingerprint recognition, in accordance with an exemplary embodiment. FIG. 3 is explained in conjunction with the FIGS. 1 and 2. FIG. 3 depicts the fingers 302 of a user's hand, with specific annotations and processing elements that assist in biometric recognition and feature extraction. The image 300 shows a top-down view of an extended hand, where individual fingers are clearly visible. Each finger 302 is outlined with bounding boxes 304, indicating regions of interest (ROIs) used for fingerprint processing. Further, the segmented regions are intended for extracting individual fingerprint details from each finger. In an embodiment, a machine learning model may segment a fingertip of each of the finger 302, in a smaller bounding box 306. The smaller bounding box 306 may bound the uppermost section of each of the finger 302, to extract the features of the fingerprint.

Further, a label "FINGERTIP 4752 (MANUAL)" is displayed on the fingertip of the index finger, indicating a detected fingertip reference point. The annotation suggests that the fingertip position has been manually adjusted or confirmed. In an embodiment, the machine learning model may extract the fingertip of the index finger for further processing.

Figure 4:
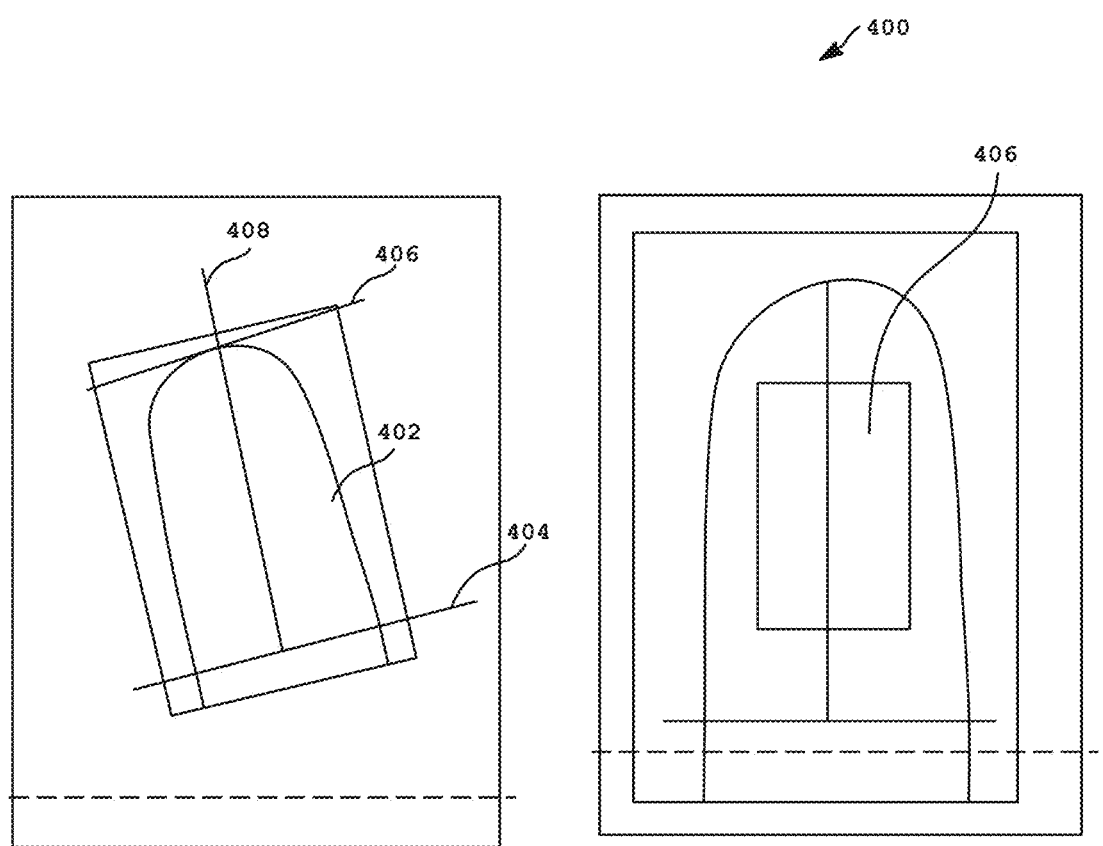
FIG. 4 illustrates an image of the fingerprint for extracting a Region of Interest (ROI) mobile fingerprint recognition, in accordance with an exemplary embodiment.

FIG. 4 illustrates an image 400 of the fingerprint for extracting a normalized fixed size Region of Interest (ROI) 406 for mobile fingerprint recognition, in accordance with an exemplary embodiment. FIG. 4 is explained in conjunction with the FIGS. 1, 2, and 3. FIG. 4 depicts the segmented finger from the image 300. The machine learning model may detect a baseline 404 of the finger and the fingertip 406 of the finger as explained in detail in FIG. 2. Further, an axis 408 is identified between the baseline 404 and the fingertip 406, for aligning the fingerprint 402. The fingerprint 402 is then aligned in a way that the axis 408 is perpendicular to a horizontal plane. Further, a normalized fixed size Region of Interest (ROI) 410 is extracted from the aligned fingerprint 402. The ROI 410 is extracted from a region of the fingerprint 402 that comprises most information such as a middle region of the fingerprint 402 around the axis 408. The extracted ROI 410 is further processed to generate the fixed-length feature set of the fingerprint 402.

Figure 5:
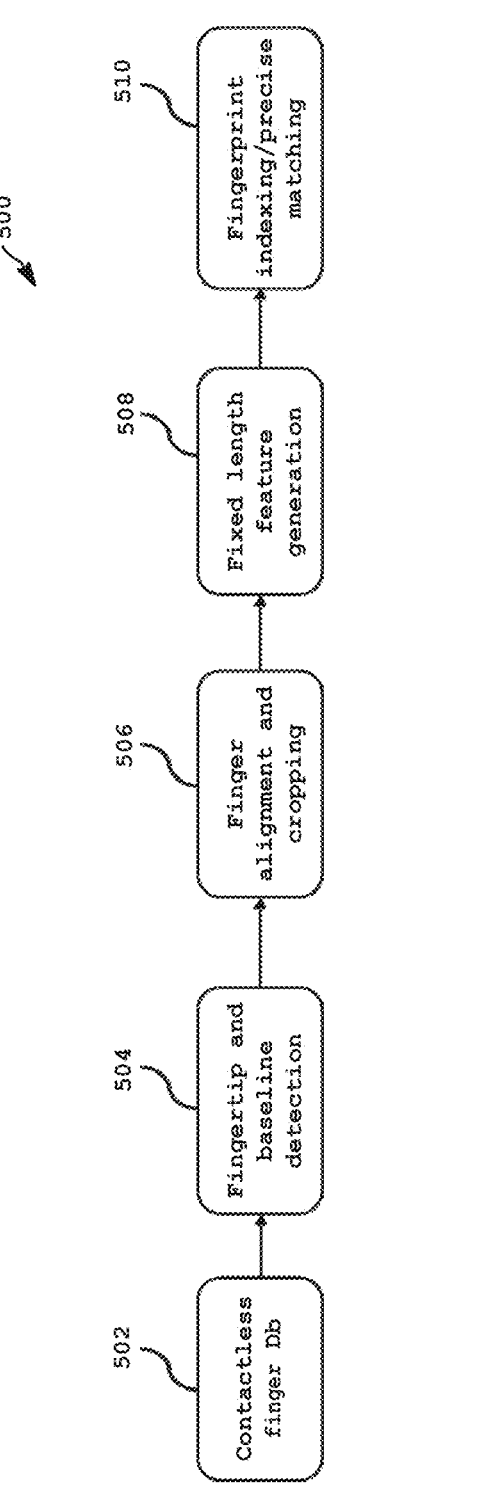
FIG. 5 illustrates an exemplary flow chart for mobile fingerprint recognition, in accordance with an exemplary embodiment.

FIG. 5 illustrates an exemplary flow chart 500 for mobile fingerprint recognition, in accordance with an exemplary embodiment. FIG. 5 is explained in conjunction with the FIGS. 1, 2, 3, and 4. At step 502, an image of a fingerprint is received. The image of the fingerprint may be retrieved from a database, or may be captured by a smartphone, a tablet, a camera, an optical sensor, etc.

At step 504, a fingertip and a baseline of the fingerprint is detected from the image of the fingerprint. The fingertip may be the topmost part of the finger in the captured fingerprint image. An edge detection algorithm and a contour analysis may be used to determine the highest point of the finger (fingertip). Further, the baseline may be a lower boundary of the fingerprint region, often corresponding to where the finger starts on the sensor.

At step 506, the image of the fingerprint is aligned and cropped based on the detected fingertip and the baseline of the fingerprint. In an embodiment, the detected fingertip and the baseline define a coordinate system for the fingerprint. If the finger is tilted or misaligned, image processing techniques such as rotation correction or geometric transformations are applied to align the fingerprint properly, ensuring that the fingerprint is positioned consistently across different captures, reducing variability in feature extraction. After alignment, a normalized fixed size region of interest (ROI) is extracted from the fingerprint image. The cropping ensures that the same fixed-length feature area is used for fingerprint recognition, regardless of sensor differences or image resolutions, maintaining uniformity in the fingerprint data, making it suitable for deep learning-based feature extraction and indexing.

At step 508, a fixed length feature set is generated of the fingerprint. The aligned fingerprint image is processed using deep learning-based techniques to extract features such as ridge patterns, minutiae points bifurcations, ridge endings, and texture details. Further, the fixed length feature vector is generated based on the extracted features using techniques like template embedding, fingerprint hashing, or deep neural network encodings. The fixed-length representation ensures that every fingerprint is stored and compared using the same format, allowing faster searching, indexing, and matching in large databases.

At step 510, the fingerprint is indexed or matched based on the fixed length feature set. Indexing helps in efficiently retrieving a fingerprint from a large database by reducing the search space. A multi-indexing approach may be used for indexing which may use both local and global features from the fixed-length representation. This approach organizes fingerprint templates in a structured manner for quick lookup. Further, the matching determines whether the extracted fingerprint corresponds to an existing fingerprint in the database using a deep learning based matching technique (neural network classifier). The deep learning based matching technique may compare feature vectors using distance metrics such as cosine similarity, Euclidean distance to find the closest match.

FIG. 6 illustrates an exemplary flow chart of a method 600 for mobile fingerprint recognition, in accordance with an exemplary embodiment. It will be understood that each block of the flow diagram of the method 600 may be implemented by various means, such as hardware, firmware, processor, circuitry, and/or other communication devices associated with execution of software comprising one or more computer program instructions. For example, one or more of the procedures described above may be embodied by computer program instructions. In this regard, the computer program instructions which embody the procedures described above may be stored by a memory 106 of the processing engine 102, employing an embodiment of the present disclosure and executed by the processor 104. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

FIG. 6 is explained in conjunction with elements from FIGS. 1, 2, 3, 4, and 5. At step 602, the method 600 is initiated. The method 600, at step 604 may comprise receiving an image of a fingerprint. The image of the fingerprint may contain unique biometric patterns, such as ridges, valleys, and minutiae points, which are used for identification and authentication. The quality and consistency of the captured image directly affect the accuracy of fingerprint recognition. Therefore, a high-quality fingerprint image is obtained from the user before further processing.

The method 600, at step 606 may comprise detecting a set of parameters associated with the fingerprint. The set of parameters may comprise a baseline of the fingerprint and a fingertip of the fingerprint. The set of parameters serve as anchors to align the fingerprint image correctly. By detecting the fingertip and baseline, a fixed coordinate system is established, which helps normalize variations caused by different finger placements, angles, or distances from the sensor in contactless fingerprint capture. The alignment ensures that the extracted fingerprint features remain consistent, improving accuracy in fingerprint recognition.

The method 600, at step 608 may comprise aligning the fingerprint in the image based on the detected set of parameters. The aligning of the fingerprint may comprise performing at least one of an iterative closest point (ICP) and an active appearance model (AAM) to refine alignment. The alignment ensures that the fingerprint image is correctly positioned for further processing, such as feature extraction and matching.

The method 600, at step 610 may comprise extracting a normalized fixed size Region of Interest (ROI) from the aligned fingerprint. After the fingerprint is aligned by detecting the fingertip and baseline, the ROI is extracted to focus on the most relevant portion of the fingerprint. This helps in standardizing the data used for feature extraction, minimizing distortions, and improving the efficiency of matching algorithms. Further, the extracted ROI serves as a fixed reference for deep learning-based feature generation, ensuring that the fingerprint features are consistently compare despite variations in capture conditions.

The method 600, at step 612 may comprise generating a fixed-length feature set from the extracted ROI. Once the ROI is extracted, a deep learning-based method or another algorithmic approach is used to extract key fingerprint features. Unlike traditional minutiae-based approaches that rely on individual ridge and valley points, the method 600 captures a fixed-length feature vector representing the fingerprint as a whole. To ensure uniformity in fingerprint representation, the extracted features are transformed into a fixed-length vector. This is typically achieved through a feature embedding method such as fingerprint hashing, template embedding, or deep feature encoding.

The method 600, at step 614 may comprise performing one or more operations on the fingerprint based on the generated fixed-length feature set. The one or more operation comprises at least one of an indexing the fingerprint and a matching the fingerprint based on the extracted fixed-length feature set. Further, the method 600 may comprise generating a multi-indexed feature representation using a local fingerprint database and a global fingerprint database. The method 600 further comprise performing a similarity comparison of the extracted fixed-length feature set using a deep-learning-based matching algorithm. Finally, the method 600 may comprise performing at least one of score-level fusion or hybrid matching. In an embodiment, the fixed-length feature set serves as the basis for fingerprint indexing and matching. Indexing is a crucial step in biometric systems, enabling quick retrieval of fingerprint data from large-scale databases. Using a structured index, the method 600 may narrow down search results and reduce computational overhead. The fixed-length feature set allows for a more efficient indexing mechanism, ensuring rapid lookup and retrieval. For matching, the extracted feature set is compared against existing fingerprints in the database to determine identity. Instead of relying on traditional minutiae-based comparison, which is often affected by alignment or resolution variations, the fixed-length feature representation allows for a direct and efficient comparison using modern matching techniques.

In an exemplary embodiment, upon a traveller's arrival, a contactless fingerprint scanner captures their fingerprint, which is then processed to recognize the identity of the traveller. The fingerprint is first aligned using fingertip and baseline detection, and a fixed-length feature set is generated. This feature set is then indexed in a multi-indexed database, starting with a local airport database and, if necessary, extending to a global fingerprint repository, such as an immigration database. A deep-learning-based matching algorithm compares the extracted features against stored fingerprint templates, ensuring accurate identification despite variations in resolution or alignment. If multiple matching scores are generated, score-level fusion or hybrid matching enhances accuracy, reducing false rejections or acceptances. This streamlined approach enables fast identity verification, reducing waiting times while maintaining high security and accuracy, making the process efficient for both the travellers and the border authorities.

In an embodiment, the present disclosure discloses a non-transitory computer-readable medium storing computer-executable instructions for mobile fingerprint recognition. The computer-executable instructions is configured for receiving an image of a fingerprint. Further, the computer-executable instructions is configured for detecting a set of parameters associated with the fingerprint. The computer-executable instructions is further configured for aligning the fingerprint in the image based on the detected set of parameters. Further, the computer-executable instructions is configured for extracting a normalized fixed size Region of Interest (ROI) from the aligned fingerprint. The computer-executable instructions is further configured for generating a fixed-length feature set from the extracted ROI. Further, the computer-executable instructions is configured for performing one or more operations on the fingerprint based on the generated fixed-length feature set.

Figure 7:
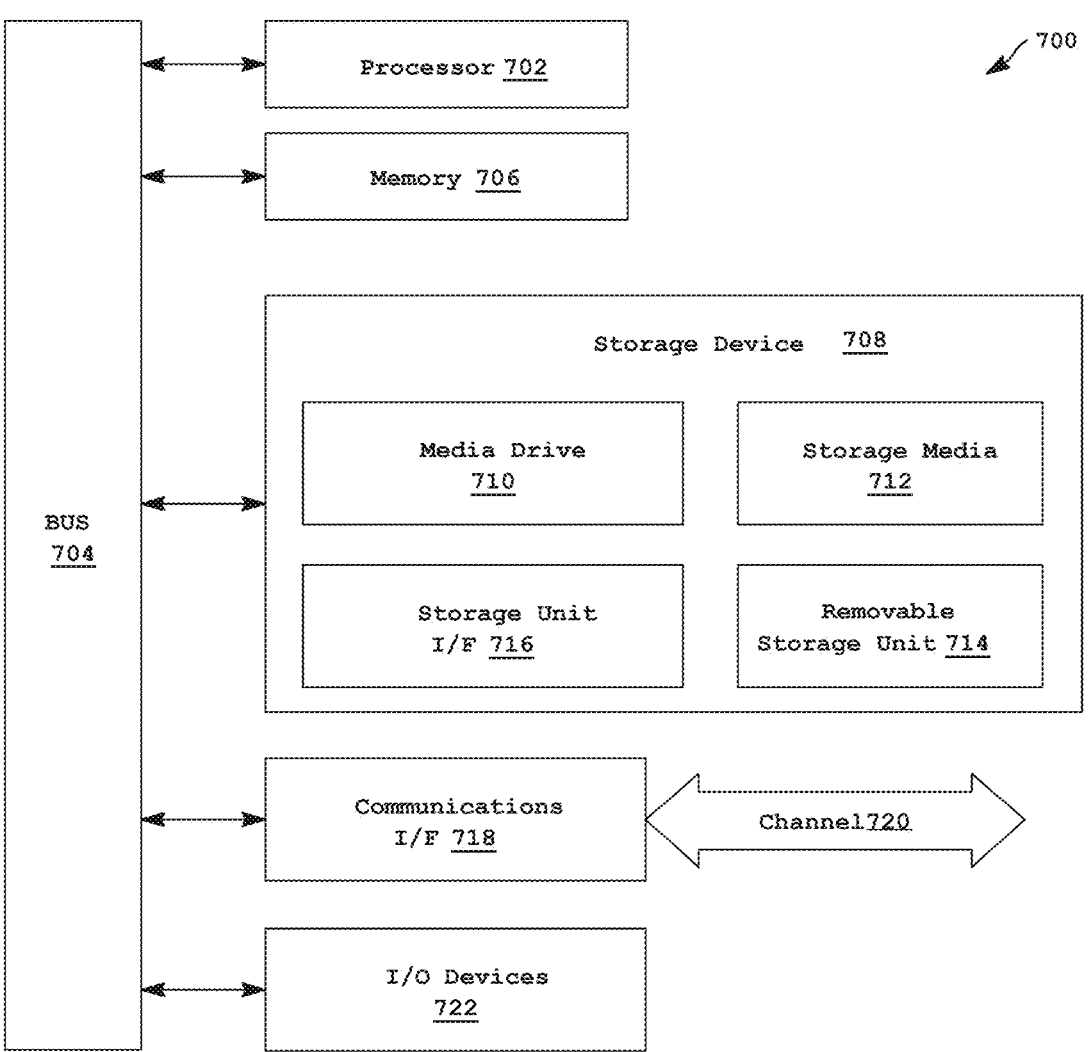
FIG. 7 illustrates an exemplary computing system for implementation of a method for mobile fingerprint recognition, in accordance with an exemplary embodiment.

FIG. 7 illustrates an exemplary computing system 700 for implementation of a method for mobile fingerprint recognition, in accordance with an exemplary embodiment.

The computing system 700 may represent, for example, an end device that involves network connection. In an embodiment, the end device may comprise, but not limited to a smart phone, a laptop computer, a desktop computer, a workstation, a portable computer, a handheld, or a mobile device. In an embodiment, the computing system 700 may represent, for example, an end-device with the provision of mobility. Examples of the end-device with the provision of mobility may comprise but not limited to a Telematics Control Unit (TCU), an infotainment system, a Vehicle-to-Everything Device (V2X) device, an On-board Diagnostics Device (OBD), an Advanced Driver Assistance Systems (ADAS) sensor, and the like. The computing system 700 may comprise one or more processors, such as a processor 702 that may be implemented using a general or special purpose processing engine such as, for example, a microprocessor, microcontroller or other control logic. In this example, the processor 702 is connected to a bus 704 or other communication medium. In an embodiment, examples of processor 702 may comprise, but are not limited to, microcontrollers, microprocessors, digital signal processors (DSPs), application-specific integrated circuits (ASICs), field-programmable gate arrays (FPGAs), system-on-chip (SoC) components, or any other suitable programmable logic devices, system-on-a-chip processors or other future processors.

The computing system 700 may also comprise a memory 706 (main memory), for example, Random Access Memory (RAM) or other dynamic memory, for storing information and instructions to be executed by the processor 702. The memory 706 also may be used for storing temporary variables or other intermediate information during execution of instructions to be executed by the processor 702. The computing system 700 may likewise comprise a read only memory ("ROM") or other static storage device coupled to bus 704 for storing static information and instructions for the processor 702.

The computing system 700 may also comprise a storage device 708, which may comprise, for example, a media drive 710 and a removable storage interface 714. The media drive 710 may comprise a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 712 may comprise, for example, a hard disk, magnetic tape, flash drive, or other fixed or removable medium that is read by and written to by the media drive 710. As these examples illustrate, the storage media 712 may comprise a computer-readable storage medium having stored there in particular computer software or data.

In some embodiments, the storage devices may comprise other similar instrumentalities for allowing computer programs or other instructions or data to be loaded into the computing system 700. Such instrumentalities may comprise, for example, a removable storage unit 714 and a storage unit interface 716, such as a program cartridge and cartridge interface, a removable memory (for example, a flash memory or other removable memory module) and memory slot, and other removable storage units and interfaces that allow software and data to be transferred from the removable storage unit 714 to the computing system 700.

The computing system 700 may also comprise a communications interface 718. The communications interface 718 may be used to allow software and data to be transferred between the computing system 700 and external devices. Examples of the communications interface 718 may comprise a network interface (such as an Ethernet or other NIC card), a communications port (such as for example, a USB port, a micro-USB port), Near field Communication (NFC), etc. Software and data transferred via the communications interface 718 are in the form of signals which may be electronic, electromagnetic, optical, or other signals capable of being received by the communications interface 718. These signals are provided to the communications interface 718 via a channel 720. The channel 720 may carry signals and may be implemented using a wireless medium, wire or cable, fiber optics, or another communications medium. Some examples of the channel 720 may comprise a phone line, a cellular phone link, an RF link, a Bluetooth link, a network interface, a local or wide area network, and other communications channels.

The computing system 700 may further comprise Input/Output (I/O) devices 722. Examples may comprise, but are not limited to a display, keypad, microphone, audio speakers, vibrating motor, LED lights, etc. The I/O devices 722 may receive input from a user and also display an output of the computation performed by the processor 702. In this document, the terms "computer program product" and "computer-readable medium" may be used generally to refer to media such as, for example, the memory 706, the storage devices 708, the removable storage unit 714, or signal(s) on the channel 720. These and other forms of computer-readable media may be involved in providing one or more sequences of one or more instructions to the processor 702 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into the computing system 700 using, for example, the removable storage unit 714, the media drive 710 or the communications interface 718. The control logic (in this example, software instructions or computer program code), when executed by the processor 702, causes the processor 702 to perform the functions of the invention as described herein.

As will be appreciated by those skilled in the art, the techniques described in the various embodiments discussed above are not routine, or conventional, or well understood in the art. The techniques discussed above provide for innovative solutions to address the challenges associated with mobile fingerprint recognition. The disclosed techniques offer several advantages over the existing methods as listed in below paragraphs.

The present disclosure introduces a method and system that provides a novel coordinate based on the fingertip and baseline for accurate finger alignment, reducing errors caused by rotation, translation, and perspective distortion in contactless fingerprint capture.

The present disclosure introduces a method and a system that implements a dynamic cropping technique that adjusts the fingerprint region based on varying resolutions, ensuring consistent feature extraction regardless of the sensor or image quality.

The present disclosure introduces a method and system that employs deep learning-based methods to generate a standardized fixed-length feature representation, enhancing matching accuracy and interoperability across different fingerprint capture devices.

The present disclosure provides a method and a system that introduces multi-indexing, which leverages both global and local fingerprint features for efficient database retrieval, reducing computational complexity, enabling real-time fingerprint identification in large databases.

The present disclosure introduces a method and a system that handles distortions caused by different finger positions, lighting conditions, and image acquisition environments, minimizing false minutiae detection and improves true match rates.

The present disclosure introduces a system and a method that integrates deep-learning-based matching techniques to improve precision and reduce false rejection rates.

The present disclosure provides a method and a system that reduces processing time for fingerprint feature extraction, indexing, and matching, enabling quick authentication in security-critical applications such as border control and access management.

The disclosed techniques offer several applications as listed in below paragraphs.

The present disclosure may be used to enhance security in mobile devices, banking apps, and enterprise authentication systems using contactless fingerprint recognition.

The present disclosure may be used to speed up identity verification at airports, immigration checkpoints, and e-gates with fast and accurate fingerprint matching.

The present disclosure may assist in criminal investigations by enabling contactless fingerprint identification from crime scene images and databases.

The present disclosure may be used to improve efficiency in government-issued ID programs, voter registration, and social security authentication.

The present disclosure may be used to enable secure transactions in banking, Automatic Teller Machine (ATMs), and digital payment systems with fast fingerprint verification.

The present disclosure may be used to ensure accurate patient identification and medical record access in hospitals, clinics, and telemedicine applications.

The present disclosure may be used to enable touchless employee check-in systems for accurate and fraud-proof attendance tracking.

The present disclosure may be used to support digital identity verification for e-passports, welfare distribution, and online government services.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be comprised within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It is to be understood that the above description is intended to be illustrative, and not restrictive. For example, the above-discussed embodiments may be used in combination with each other. Many other embodiments will be apparent to those of skill in the art upon reviewing the above description.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention.

We claim:

1. A system for mobile fingerprint recognition, the system comprising:
    a processing engine coupled to a memory, wherein the processing engine is configured to execute instructions stored in the memory to:
    receive an image of a fingerprint;
    detect a set of parameters associated with the fingerprint;
    align the fingerprint in the image based on the detected set of parameters;
    extract a Region of Interest (ROI) from the aligned fingerprint;
    generate a fixed-length feature set from the extracted ROI; and
    perform one or more operations on the fingerprint based on the generated fixed-length feature set.

2. The system according to claim 1, wherein the image of the fingerprint is cropped based on the extracted set of parameters.

3. A system for mobile fingerprint recognition, the system comprising:
    a processing engine coupled to a memory, wherein the processing engine is configured to execute instructions stored in the memory to:
    receive an image of a fingerprint;
    detect a set of parameters associated with the fingerprint;
    align the fingerprint in the image based on the detected set of parameters;
    extract a Region of Interest (ROI) from the aligned fingerprint;
    generate a fixed-length feature set from the extracted ROI; and
    perform one or more operations on the fingerprint based on the generated fixed-length feature set;
    wherein to perform the one or more operations, the processing engine is configured to:
    generate a multi-indexed feature representation using a local fingerprint database and a global fingerprint database;
    perform a similarity comparison of the extracted fixed-length feature set using a deep-learning-based matching algorithm; and
    perform at least one of score-level fusion or hybrid matching.

4. The system according to claim 1, wherein the one or more operations comprises at least one of indexing the fingerprint and matching the fingerprint based on the extracted fixed-length feature set.

5. The system according to claim 1, wherein to align the fingerprint, the processing engine is configured to perform at least one of an Iterative Closest Point (ICP) and an Active Appearance Model (AAM) to refine alignment.

6. A method for mobile fingerprint recognition, the method comprising:
    receiving, by a processing engine, an image of a fingerprint;
    detecting, by the processing engine, a set of parameters associated with the fingerprint;
    aligning, by the processing engine, the fingerprint in the image based on the detected set of parameters;
    extracting, by the processing engine, a Region of Interest (ROI) from the aligned fingerprint;
    generating, by the processing engine, a fixed-length feature set from the extracted ROI;
    performing, by the processing engine, one or more operations on the fingerprint based on the generated fixed-length feature set;
    wherein performing the one or more operations comprises:
    generating, by the processing engine, a multi-indexed feature representation using a local fingerprint database and a global fingerprint database;
    performing, by the processing engine, a similarity comparison of the extracted fixed-length feature set using a deep-learning-based matching algorithm; and
    performing, by the processing engine, at least one of score-level fusion or hybrid matching.

7. The method according to claim 6, wherein the image of the fingerprint is cropped based on the extracted set of parameters.

8. The method according to claim 6, wherein the set of parameters associated with the image comprises a baseline of the fingerprint and a fingertip of the fingerprint.

9. The method according to claim 6, wherein the one or more operations comprises at least one of an indexing the fingerprint and a matching the fingerprint based on the extracted fixed-length feature set.

10. The method according to claim 6, wherein aligning the fingerprint comprising performing at least one of an iterative closest point (ICP) and an active appearance model (AAM) to refine alignment.

11. A non-transitory computer-readable medium storing computer-executable instructions for mobile fingerprint recognition, the computer-executable instructions configured for:

receiving, by a processing engine, an image of a fingerprint;

detecting, by the processing engine, a set of parameters associated with the fingerprint;

aligning, by the processing engine, the fingerprint in the image based on the detected set of parameters;

extracting, by the processing engine, a Region of Interest (ROI) from the aligned fingerprint;

generating, by the processing engine, a fixed-length feature set from the extracted ROI;

performing, by the processing engine, one or more operations on the fingerprint based on the generated fixed-length feature set;

wherein performing the one or more operations comprises:

generating, by the processing engine, a multi-indexed feature representation using a local fingerprint database and a global fingerprint database;

performing, by the processing engine, a similarity comparison of the extracted fixed-length feature set using a deep-learning-based matching algorithm; and performing, by the processing engine, at least one of score-level fusion or hybrid matching.

12. The non-transitory computer-readable medium according to claim 11, wherein the set of parameters associated with the image comprises a baseline of the fingerprint and a fingertip of the fingerprint.

13. The non-transitory computer-readable medium according to claim 11, where in the one or more operations comprises at least one of an indexing the fingerprint and a matching the fingerprint based on the extracted fixed-length feature set.

* * * * *